United States Patent Office 2,870,187
Patented Jan. 20, 1959

2,870,187

O,O-DIMETHYL-O-(4-CHLORO-3-NITROPHENYL)-THIOPHOSPHORIC ACID ESTERS AND THEIR PREPARATION

Gerhard Schrader, Opladen, and Rudolf Mersch, Koln-Stammheim, Germany, assignors to Farbenfabriken Bayer Aktiengesellschaft, Leverkusen, Germany, a corporation of Germany No Drawing. Application July 27, 1956
Serial No. 600,388

Claims priority, application Germany July 29, 1955

3 Claims. (Cl. 260—461)

This invention relates to new and useful thiophosphoric acid esters, especially to O,O-dimethyl-O-(4-chloro[or-4,6 - dichloro-]-3-nitrophenyl)thiophosphoric acid ester. The compounds may be represented by the following formula

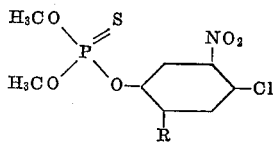

in which R stands for hydrogen or chloride.

The preparation and properties of O,O-dimethyl-O-(4-nitro-3-chlorophenyl)-thiophosphate are known from German Patent No. 921,870. This compound is an insecticide known as a very valuable plant protecting agent. It is the principal object of the present invention to provide novel and useful thiophosphoric acid esters.

Another object is to find economic processes to prepare these esters, further objects will become apparent within the following description. Now, in accordance with this invention it has been found that O,O-dimethyl-O-(4-chloro [or-4,6-dichloro-] - 3 - nitrophenyl)thiophosphoric acid ester possess considerably improved properties compared with the known 4-nitro-3-chloro compound. The two compounds according to the present invention excell the 4-nitro-3-chloro compound in an improved compatibility with plants. Furthermore they are considerably more resistant to hydrolytic influences. The toxicity of the compounds according to the invention is lower, whilst the biological action is equal to the action of the 4-nitro-3-chloro compound.

As against the known O,O-diethyl-O-(3-nitro-4-chlorophenyl) thiophosphoric acid ester or 3-nitro-4,6-dichlorophenyl-thiophosphoric acid ester the new compounds according to the invention distinguish themselves by a toxicity 5 to 10 times lower.

The preparation of the new thiophosphoric acid esters is carried out according to known methods by reacting O,O-dimethyl-chlorothiophosphate with 3-nitro-4-chlorophenyl or 3-nitro-4,6-dichlorophenyl. Preferably the reaction is carried out in an inert solvent, such as alcohols, acetone, benzene, toluene, xylene. Acid binding agents such as sodium hydroxide, sodium carbonate, potassium carbonate are necessary to substitute the chlorine by the residue of the thiophosphoric acid ester. Instead of adding acid binding agents, the reaction may also be carried out with the salts, e. g. alkali metal salts of said chloronitrophenols. To increase the yield of the new thiophosphoric acid esters it may be advisable to add metallic copper to carry out the reaction. The temperatures between the reaction should be carried out varying between approximately 0° C. to about 200° C., but it is advisable to use temperatures of about 50° C. to about 100° C.

The compounds, when used as plant-protecting agents in the insecticidal field should be used with suitable diluents or carriers in the identical manner used with chlorothion. If used in aqueous dilution the addition of emulsifiers is advisable to ensure a good distribution of the insecticidal agent. The compounds are useful against a variety of insects such as Colorado beetles, flies, mosquito larvae etc.

The following examples are given for illustration without restriction to the reaction conditions shown therein.

Example 1

140 grams of 4-chloro-3-nitrophenol are suspended in 1200 milliliters of toluene. 150 grams of dried and screened potassium carbonate in admixture with 4 grams of copper are added thereto. This mixture is heated with stirring to 85° C. for a half hour. At this temperature 177 grams of dimethyl-thionophosphoric acid chloride are then added dropwise and the temperature is maintained with further stirring at 90° C. for another 2 hours. The mixture is then cooled down to room temperature, the salts are filtered off with suction and the filtrate is washed twice with 250 milliliters of a 5% aqueous bicarbonate solution. After distilling off the solvent, 280 grams of the crude ester are obtained. The new ester distills at 122° C./0.01 mm. Hg.

Toxic properties when given to rats per os: 500 mg./kg. 3/5/5.

Example 2

215 grams of 2,4-dichloro-5-nitrophenol are suspended in 1200 milliliters of toluene. 150 grams of screened and dried potassium carbonate in admixture with 3 grams of copper are added thereto. This mixture is maintained at 95° C. for 30 minutes, 177 g. of dimethyl-thionophosphoric acid chloride are then added at the said temperature. The mixture is maintained at 95° C. for another 4 hours, then cooled down to room temperature and the product is treated as indicated in Example 1. After distilling off the solvent, 260 grams of the new ester are obtained. After being allowed to stand for a prolonged time the ester crystallizes out. By re-crystallization from methanol light yellow needles are obtained which melt at 80–82° C. When given per os, 500 mg./kg. do not kill rats (1/3/3).

We claim:

1. A thiophosphoric acid ester of the following general formula

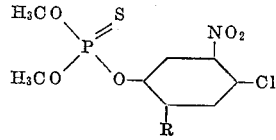

in which R stands for a member selected from the group consisting of hydrogen and chlorine.

2. O,O-dimethyl-O-(3-nitro-4-chlorophenyl) - thiophosphate.

3. O,O-dimethyl-O-(3-nitro - 4,6 - dichlorophenyl)-thiophosphate.

References Cited in the file of this patent

UNITED STATES PATENTS

| | | |
|---|---|---|
| 2,520,393 | Fletcher | Aug. 29, 1950 |
| 2,664,437 | Fletcher | Dec. 29, 1953 |
| 2,701,259 | Schrader | Feb. 1, 1955 |
| 2,758,954 | Tidwell | Aug. 14, 1956 |